United States Patent Office 3,565,831
Patented Feb. 23, 1971

3,565,831
STRONGLY ADHERENT PINE NEEDLE FRAGRANCE COMPOSITIONS
Ernst-Rolf Detert, Lubbecke, Westphalia, Germany, assignor to Eduard Gerlach GmbH Chemische Fabrik, Lubbecke, Germany, a German corporation
No Drawing. Filed Aug. 7, 1967, Ser. No. 658,633
Int. Cl. A61k 7/00
U.S. Cl. 252—522                         6 Claims

ABSTRACT OF THE DISCLOSURE

A strongly adherent fragrance composition suitable for application by spraying to artificial Christmas trees to provide them with a natural pine needle odor is provided by a mixture of pine needle oil, oil of lavender, cedar oil, in a volatile organic solvent, together with a cellulose ether fixative.

BACKGROUND OF THE INVENTION

The invention relates to a strongly adherent fragrant material composed of flower or plant essences, and particularly a fragrance composition which is adapted to be sprayed on artificial Christmas trees and foliage.

It is possible, with the aid of suitable artificial materials, and by corresponding molding or forming, and proper arrangement, to manufacture structures which closely resemble pine, fir, and Scotch fir trees, and which can be used as substitutes for Christmas trees. These products have, however, the drawback that they lack the characteristic pine odor. Attempts have been made to incorporate fragrance compositions in the plastic masses prior to molding into "needles," but without success. In the molding process the plastic masses must be heated to such a high temperature that the sensitive fragrance materials are decomposed. Moreover, the fragrance composition in consequence of the escape of readily volatile ingredients becomes altered to an unrecognizable condition.

It is, however, possible to apply a suitable pine fragrance by spraying after completion of the tree, to its "needles" and "branches." Such a fragrance must possess extraordinarily good adherence.

In the field of perfumery, the use of so-called fixatives is well known. These fixatives serve to impart body to the fragrance and to preserve the odor for the longest possible period. However, the fixative effects of the customary fixatives, consisting of resinoids or other resins, are not sufficiently far-reaching.

Accordingly, the object of the present invention is to create a new fragrance composition which makes possible the imparting of a pine fragrance having as long a duration as possible to Christmas trees.

SUMMARY OF THE INVENTION

In accordance with the present invention, there is provided a fragrance composition including a fixative, which permits establishing on an artificial tree, particularly a Christmas tree, for as long a time as possible, a Christmas tree or pine fragrance, thus enabling the artificial Christmas tree to give off a typical Christmas tree odor for as long as possible, and throughout the entire Christmas period, in which the tree is displayed, so that it will not be necessary to apply the fragrance again.

This novel long-lasting fragrance for the impregnation of artificial Christmas trees, in accordance with the invention, is made possible by the unexpected discovery that cellulose ethers are excellent fixatives for pine fragrance compositions employed for this purpose.

Although cellulose ethers, and cellulose esters as well, have been employed extensively as lacquer ingredients and film forming materials, cellulose ethers have not, prior to the present invention, been employed as fixatives in perfumery. It was known to produce shaped plastic articles from solutions of cellulose esters, such as cellulose acetate, which contained a plasticizer, and various selected essential oils, but it could not have been predicted that cellulose ethers would serve as effective fixatives for fragrance compositions adapted to be applied as a spray.

In accordance with the present invention, there is provided novel fragrance compositions adapted to be applied as a spray, and containing as a fixative, a cellulose ether. Examples of suitable cellulose ethers for this purpose include methyl-, ethyl-, and propylcellulose, but ethylcellulose is preferred.

Although the invention will be illustrated in regard to a typical fragrance composition having a Christmas tree or pine fragrance, it will be readily understood that the principles of the invention are also applicable to other types of fragrance compositions, such as, for example, flower fragrances, including, for example, rose, cloves, and the like. Solutions of such fragrances can be applied for the impregnation of artificial flowers in the same manner as to artificial trees and foliage.

The general procedure which may be followed in the preparation of the compositions of the invention is illustrated by the manufacture of a dispenser, such as an aerosol dispenser of a fragrance material. There is provided a blending vessel equipped with a stirring device. With the stirrer operating at low speed there are introduced suitable essential oils or perfume oils or essences, and the solvent. After these relatively volatile ingredients have been thoroughly mixed in the stirred vessel, there are added powdered rosin and the cellulose ether, such as ethylcellulose. The mixture is further agitated, but without heating, until a homogeneous, viscous, usually yellowish colored solution is obtained. This concentrated solution is then dissolved in a readily volatile organic solvent such as methanol or propanol, and the resulting solution is adapted to be sprayed on the artificial Christmas tree or foliage, or artificial flowers.

The concentrate can also, if desired, be admixed with a propellant gas generating liquid, and packaged in the form of an aerosol, in accordance with conventional procedures. An example of a suitable propellant gas is a fluorinated hydrocarbon, such as dichlordifluoromethane. The aerosol product is suited for spraying artificial Christmas trees and the like. As mentioned previously, the fragrances can be selected so that the odor of a particular plant or flower is reproduced, and can be applied to impregnate artificial flowers in analogous fashion.

Examples of suitable fragrance materials include various essential oils, such as lavender oil, dwarf pine oil, pine needle oil, cedar wood oil, and the like. These may be employed in the following approximate proportions, percentages being by weight:

|  | Percent |
|---|---|
| Cedarwood oil | 5–10 |
| Pine needle oil | 5–10 |
| Dwarf pine oil | 5–15 |
| Lavender oil | 5–15 |

The volatile organic solvent is advantageously a lower aliphatic alcohol, such as methanol, ethanol, propanol, or isopropanol, and this is initially employed in a range from about 20% to about 50% by weight, preferably about 35% by weight.

The cellulose ether is employed in an amount ranging from about 15% to about 25% by weight, preferably about 20%, of the total composition, and from about 50% to 100% of the essential oils present.

The rosin ingredient is preferably added as a powder, in an amount ranging from about 5% to 15% by weight, preferably about 10%.

DESCRIPTION OF THE PREFERRED EMBODIMENT

The principles of the invention are illustrated by the following example, which is not, however, to be regarded as limiting:

Example

A formulation suitable for a strongly adherent pine fragrance composition was prepared by dissolving in a vessel equipped with stirrer, 35% of methanol, 5% lavender oil, 15% dwarf pine oil, 5% pine needle oil, and 10% cedarwood oil, all percentages being by weight. After thorough mixing, there was added 20% by weight of ethylcellulose and 10% by weight of powdered rosin, and mixing was continued until a homogeneous, viscous, yellowish solution was obtained. This concentrate solution is adapted, upon dilution, for spraying on artificial trees or foliage. It can be diluted to any desired concentration by further addition of a volatile organic solvent, such as methanol or isopropanol, in a ratio of about 1 part concentrate to about 4 parts solvent, by weight. It can also be put up in aerosol spray cans upon admixture with a suitable propellant.

What is claimed is:

1. A concentrated fragrance composition adapted to impart a persistent pine odor of long duration and consisting essentially of an essential oil component, a volatile organic solvent component, a fixative component, and powdered rosin;
    the essential oil component consisting of 5–10% cedarwood oil, 5–10% pin needle oil, 5–15% dwarf pine oil, and 5–15% lavender oil;
    the solvent component consisting of 20–50% lower aliphatic alcohol;
    the fixative component consisting of 15–25% cellulose ether selected from the group consisting of methyl-, ethyl-, and propylcellulose; and
    powdered rosin in the amount of 5–15%;
    all percentages being by weight of the total composition.

2. The composition of claim 1 in which the solvent component is methanol.

3. The composition of claim 1 in which the solvent component is isopropanol.

4. The composition of claim 1 in aerosol form in a fluorinated hydrocarbon propellant therefor.

5. A concentrated fragrance composition adapted to impart a persistent pine odor of long duration consisting of, in percentages by weight:

| | Percent |
|---|---|
| Cedarwood oil | 10 |
| Pine needle oil | 5 |
| Dwarf pine oil | 15 |
| Lavender oil | 5 |
| Methanol | 35 |
| Ethylcellulose | 20 |
| Powdered rosin | 10 |

6. The composition of claim 5 in aerosol form in a fluorinated hydrocarbon propellant therefor.

References Cited

UNITED STATES PATENTS

| 1,594,746 | 8/1926 | Munn | 161—30 |
| 2,710,825 | 6/1955 | Lazier et al. | 252—522 |
| 3,163,574 | 12/1964 | Tong | 161—30 |

OTHER REFERENCES

Dingfelder, A., "Soap & Chem. Specialties," vol. 33:1, January 1957, pp. 41–43.

Bedoukian, P., "Am. Perfumer & Cosmetics," vol. 78, April 1963, pp. 24–25.

Chem. Abst., vol. 55, p. 20335g (1961).

Gregory, T., "Uses and App. of Chem. and Related Materials" (1939), Reinhold Pub., pp. 330, 331, 376–377.

Sagarin, E., Cosmetics-Science & Technology" (1957), Interscience Pub., pp. 678–679, 826–827.

STANLEY J. FRIEDMAN, Primary Examiner

V. D. TURNER, Assistant Examiner